(12) United States Patent
Lee et al.

(10) Patent No.: US 9,374,122 B2
(45) Date of Patent: Jun. 21, 2016

(54) INTEGRATED ON-CHIP DUPLEXER FOR SIMULTANEOUS WIRELESS TRANSMISSION

(71) Applicant: Broadcom Corporation, Irvine, CA (US)

(72) Inventors: Brian Lee, San Diego, CA (US); Ali Afsahi, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 218 days.

(21) Appl. No.: 14/070,195

(22) Filed: Nov. 1, 2013

(65) Prior Publication Data
US 2015/0085709 A1  Mar. 26, 2015

Related U.S. Application Data (60) Provisional application No. 61/882,920, filed on Sep. 26, 2013.

(51) Int. Cl.
| | | |
|---|---|---|
| *H04B 1/44* | (2006.01) | |
| *H04L 5/14* | (2006.01) | |
| *H04B 1/50* | (2006.01) | |

(52) U.S. Cl.
CPC .. *H04B 1/44* (2013.01); *H04L 5/14* (2013.01); *H04B 1/50* (2013.01)

(58) Field of Classification Search
None
See application file for complete search history.

(56) References Cited

U.S. PATENT DOCUMENTS

| | | | |
|---|---|---|---|
| 2007/0223430 A1* | 9/2007 | Desai et al. | 370/338 |
| 2009/0239471 A1* | 9/2009 | Tran et al. | 455/41.2 |
| 2010/0210299 A1* | 8/2010 | Gorbachov | 455/552.1 |
| 2011/0009074 A1* | 1/2011 | Hsu et al. | 455/73 |
| 2011/0171994 A1* | 7/2011 | Rajendran et al. | 455/552.1 |
| 2013/0161785 A1 | 6/2013 | Ding et al. | |
| 2015/0017978 A1* | 1/2015 | Hong et al. | 455/426.1 |

OTHER PUBLICATIONS

Chen, Ji, et al., On-Chip Spiral Inductors for RF Applications: An Overview, Journal of Semiconductor Technology and Science, vol. 4, No. 3, Sep. 2004, 19 pages.

* cited by examiner

*Primary Examiner* — Hassan Phillips
*Assistant Examiner* — Saba Tsegaye
(74) *Attorney, Agent, or Firm* — Brinks Gilson & Lione (57) ABSTRACT

An electrical balancing network combined with coupled inductors (EBN) replaces a transmit/receive switch was used for isolation for time division duplexing transmission techniques. The EBN allows simultaneous transmit operation, or simultaneous receive operation, of multiple wireless technologies that would otherwise have to be scheduled for transmit or receive in a time division multiplexing manner. The wireless technologies may be WLAN, LTE, Bluetooth or other wireless technologies.

20 Claims, 13 Drawing Sheets

INTEGRATED ON-CHIP DUPLEXER FOR SIMULTANEOUS WIRELESS TRANSMISSION

CROSS REFERENCE TO RELATED APPLICATIONS

This application claims priority to provisional application Ser. No. 61/882,920, filed Sep. 26, 2013, which is incorporated by reference in its entirety.

TECHNICAL FIELD

This disclosure relates to wireless communications. This disclosure also relates to simultaneous transmission and simultaneous reception using multiple different wireless technologies.

BACKGROUND

Rapid advances in electronics and communication technologies, driven by immense customer demand, have resulted in the widespread adoption of mobile communication devices. The extent of the proliferation of such devices is readily apparent in view of the common practice of carrying multiple cellular phones (e.g., one for work and one for home) and the widespread adoption of tablet computers with wireless connection options. Improvements to the wireless communication capabilities of such devices will continue to enhance the communication capabilities of these devices.

DETAILED DESCRIPTION

The discussion below makes reference to isolation circuits that support simultaneous transmit operation and simultaneous receive operation for multiple different wireless technologies. The time simultaneous operation may include frequency division duplexing (FDD) operation. That is, the isolation circuits facilitate time simultaneous operation, in addition to time-division duplexing (TDD) operation, for the multiple different wireless technologies. The isolation circuits provide enhanced isolation between the different wireless technologies, and their transmit and receive paths, that helps to provide time simultaneous operation as a viable implementation option, and therefore obtain increased spectral utilization and system throughput.

To provide an example context in which the isolation circuits may be used, the discussion below provides the example of user equipment (UE). UE may take many different forms and have many different functions. As one example, UE may be a 2G, 3G, or 4G/LTE cellular phone capable of making and receiving wireless phone calls, and transmitting and receiving data using 802.11 a/b/g/n/ac/ad ("WiFi"), Bluetooth (BT), Near Field Communications (NFC), or any other type of wireless technology. The UE may also be a smartphone that, in addition to making and receiving phone calls, runs any number or type of applications. UE may, however, be virtually any device that transmits and receives information, including as additional examples a driver assistance module in a vehicle, an emergency transponder, a pager, a satellite television receiver, a networked stereo receiver, a computer system, music player, or virtually any other device. The isolation circuits discussed below may also be implemented in other devices, such as a base station or other network controller that communicates with the UE.

Figure 1:
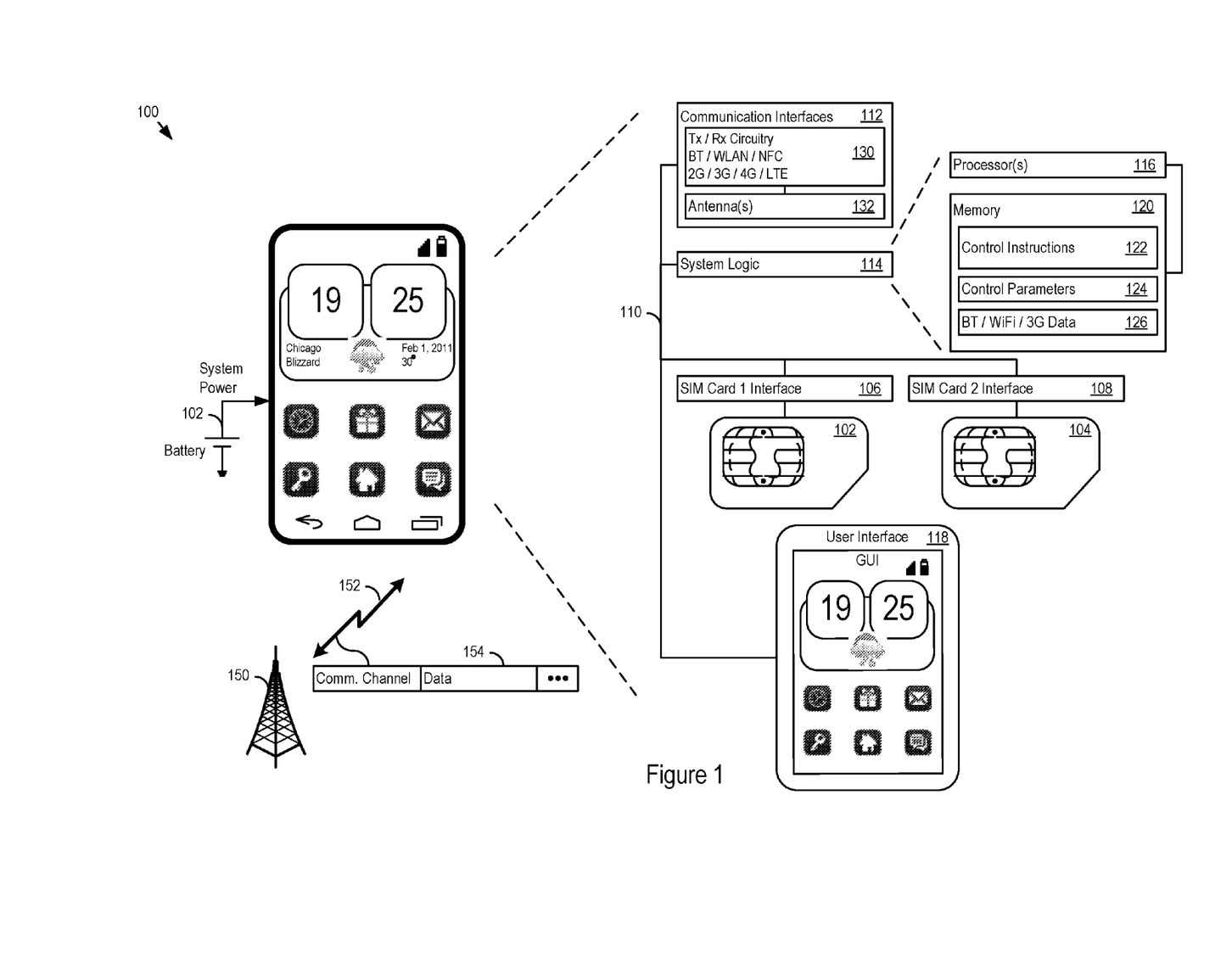
FIG. 1 shows an example of user equipment.

FIG. 1 shows an example of UE 100 in communication with a network controller 150, such as an enhanced Node B (eNB) or other base station. The network controller 150 and UE 100 establish communication channels 152 and exchange data 154 of any type. In this example, the UE 100 supports one or more Subscriber Identity Modules (SIMs), such as the SIM1 102 and the SIM2 104. Electrical and physical interfaces 106 and 108 connect SIM1 102 and SIM2 104 to the rest of the user equipment hardware, for example, through the system bus 110.

The UE 100 includes communication interfaces 112, system logic 114, and a user interface 118. The system logic 114 may include any combination of hardware, software, firmware, or other logic. The system logic 114 may be implemented, for example, with one or more systems on a chip (SoC), application specific integrated circuits (ASIC), discrete analog and digital circuits, and other circuitry. The system logic 114 is part of the implementation of any desired functionality in the UE 100. In that regard, the system logic 114 may include logic that facilitates, as examples, running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying information on the user interface 118. The user interface 118 may include a graphical user interface, touch sensitive display, voice or facial recognition inputs, buttons, switches, speakers and other user interface elements.

The system logic 114 may include one or more processors 116 and memories 120. The memory 120 stores, for example, control instructions 122 that the processor 116 executes to carry out desired functionality for the UE 100. The control parameters 124 provide and specify configuration and operating options for the control instructions 122. The memory 120 may also store any BT, WiFi, 3G, or other data that the UE 100 will send, or has received, through the communication interfaces 112.

In the communication interfaces 112, Radio Frequency (RF) transmit (Tx) and receive (Rx) circuitry 130 handles transmission and reception of signals through one or more antennas 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 112 may support transmission and reception under the 3G, BT, WiFi, and 4G/Long Term Evolution (LTE) standards. The techniques described below, however, are applicable to other wireless communications technologies whether arising from the 3rd Generation Partnership Project (3GPP), GSM® Association, Universal Mobile Telecommunications System (UMTS), High Speed Packet Access (HSPA)+, or other partnerships or standards bodies.

Figure 2:
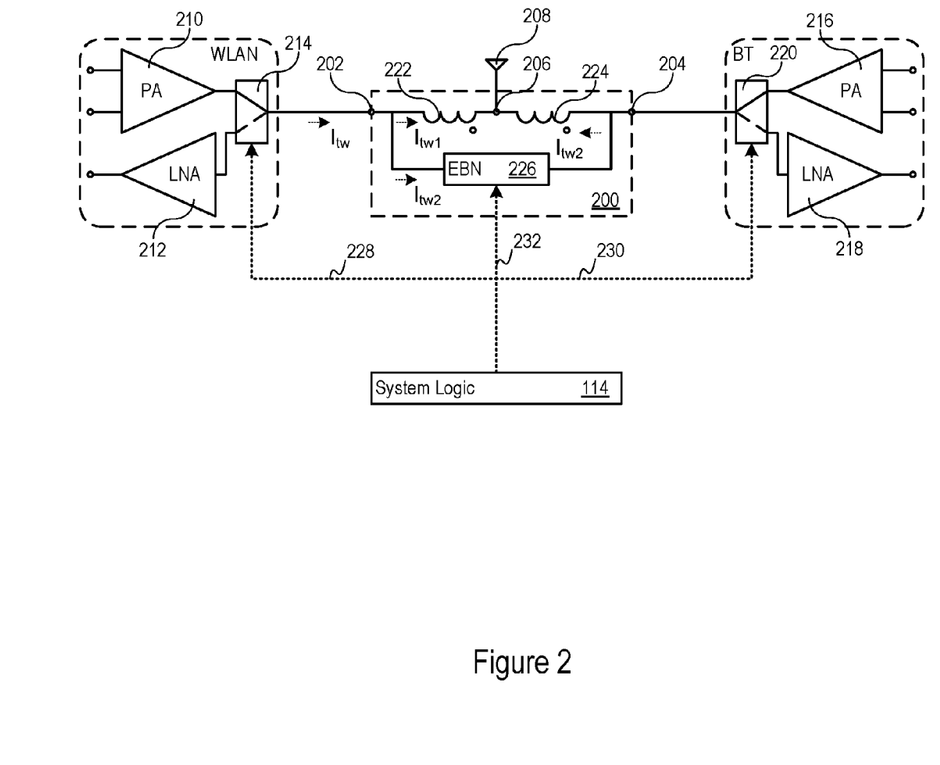
FIG. 2 is an example of a first realization of an isolation circuit.

FIG. 2 shows an example of a first realization of an isolation circuit 200 that may be present in the communication interfaces 112, e.g., in the Tx/Rx circuitry 130. The isolation circuit 200 includes a first port 202 for a first wireless technology (e.g., 802.11 based Wireless Local Area Networking (WLAN)), a second port 204 for a different second wireless technology (e.g., BT), and an antenna port 206. An antenna 208 connects to the antenna port 206, and the antenna 208 is characterized by a particular impedance.

In the example in FIG. 2, a WLAN power amplifier (PA) 210 and a WLAN low noise amplifier (LNA) 212 support transmit and receive operation for the WLAN. The WLAN PA 210 and LNA 212 connect to the first port 202 through a transmit/receive switch 214. Similarly, a BT power amplifier (PA) 216 and a WLAN low noise amplifier (LNA) 218 support transmit and receive operation for BT operation. WLAN and BT are simply examples or wireless technologies, and the isolation techniques described below are application to any additional or different wireless technologies (e.g., NFC, 2G, 3G, and LTE). That is, the isolation circuits are not limited to use with WLAN and BT.

The BT PA 216 and LNA 218 connect to the second port 204 through a transmit/receive switch 220. The UE 100, e.g., using the system logic 114 or the logic in the communication interfaces 112, may assert transmit/receive control signals 228 and 230 to individually set the transmit/receive switches 214 and 220 to transmit mode or to receive mode. Because of the isolation provided by the isolation circuit 200, the system logic 114 may set both WLAN and BT to transmit, or both WLAN and BT to receive, at the same time.

The antenna port 206 is shared by the first port 202 and the second port 204. For example, both BT and WLAN transmit signals are applied to the antenna 208. Similarly, both BT and WLAN receive signals originate from the antenna 208.

The isolation circuit 200 includes a first inductive connection 222 from the first port 202 to the antenna port 206. The isolation circuit 200 also includes a second inductive connection 224 from the second port 204 to the antenna port 206. The inductive connections may be inductors, such as on-chip passive inductors.

In addition, an electrical balancing network (EBN) 226 is present, and is coupled across the first port 202 and the second port 204. The EBN 226, as with all of the EBNs discussed below, may comprise an impedance that attempts to match the impedance of the antenna 208. To that end, the system logic 114 may provide a tuning control input 232 to configure the EBN 226, or any other EBN discussed below. For instance, the tuning control input 232 may select, set, or otherwise configure tunable inductors, capacitors, and resistors in the EBN 226 to match the impedance of the antenna 208. The system logic 114 may dynamically tune the EBN 226. For example, the system logic 114 may transmit e.g., using the WLAN, and analyze the signal arriving at the BT receiver. The system logic 114 may tune the EBN 226 to minimize the received signal.

The first and second inductive connections 222 and 224 are connected so that their polarities act to form a current counterbalance. In more detail, assume that the WLAN is transmitting (possibly at the same time as the BT). Assume that current $I_{pw}$ flows into the first port 202 and, because the EBN 226 approximately matches the antenna impedance, splits approximately equally into $I_{pw1}$ and $I_{pw2}$. The counterbalancing inductive coupling of the first inductive connection 222 to the second inductive connection 224 draws a current equal to $I_{pw1}$ through the second inductive connection 224. That current is provided by $I_{pw2}$ flowing through the EBN 226, and therefore the BT side does not need to provide the current. In effect, the BT side is isolated from the effects of the WLAN side. The opposite is also true for the same reason—the WLAN side is isolated from the effects of the BT side.

For reception, the antenna 208 receives an incoming RF signal and generates a receive current. The received current splits approximately equally through the first and second inductive connections 222 and 224. As a result, each of the LNAs 212 and 218 receives a portion of the receive power (e.g., 50%) and each set of transceiver circuitry may independently analyze the received signal for BT or WLAN data content.

Figure 3:
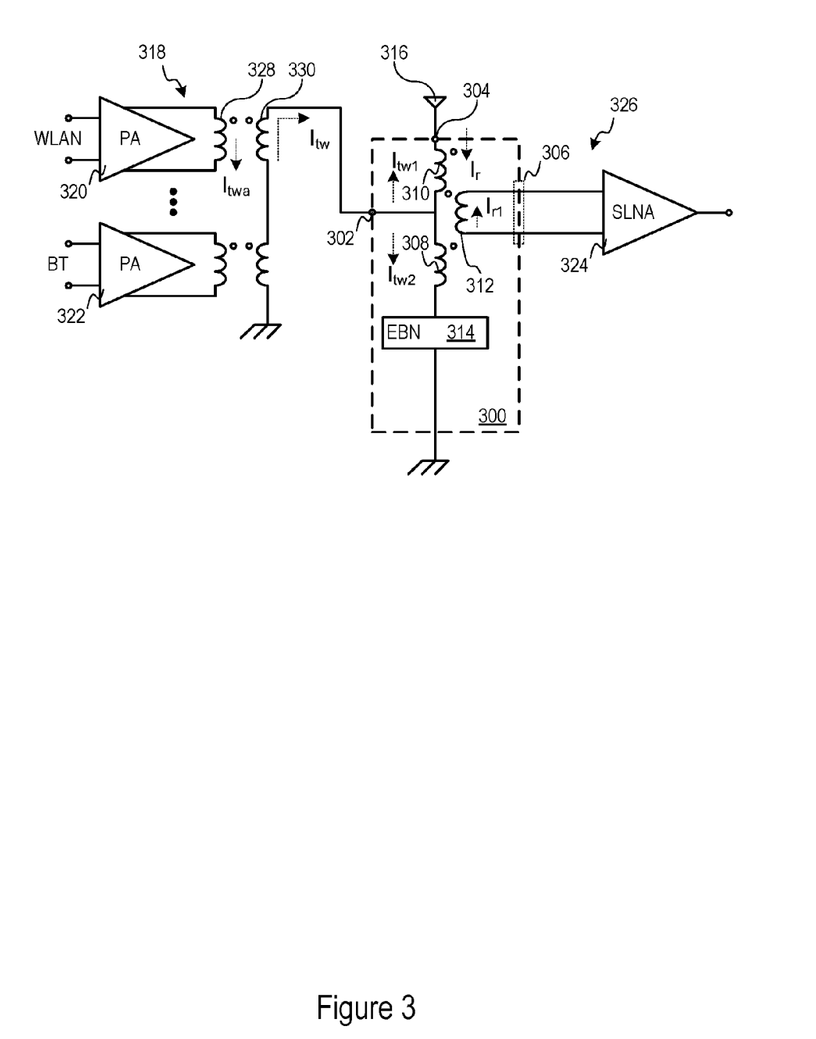
FIG. 3 is an example of a second realization of an isolation circuit.

FIG. 3 is an example of a second realization of an isolation circuit 300. The isolation circuit 300 may provide on the order of 200 to 300 MHz of wideband isolation. The isolation circuit 300 includes a transmit port 302 shared by a first wireless technology (e.g., WLAN technology) and a different second wireless technology (e.g., BT technology). An antenna port 304 is also present. The wireless technologies share a receive port 306. For the purposes of illustration, the receive port 306 is shown in FIG. 3 as a differential receive pair, however the receive port may also be considered to be the inductive couplings between the first inductive connection 310 and the second inductive connection 308, and the third inductive connection 312. These inductive couplings are described in more detail below.

The first inductive connection 310 is between the transmit port 302 and the antenna port 304. The second inductive connection 308 runs between the first inductive connection 310 and an EBN 314. The EBN 314 may be configured to match an impedance at the antenna port, e.g., to match the impedance of the antenna 316. The second inductive connection 308 is configured to provide a current counterbalance to the first inductive connection 310. The third inductive connection 312 is inductively coupled to the first inductive connection 310 and the second inductive connection 308.

On the transmit side 318, individual PAs may be inductively coupled to the transmit port 302. The example in FIG. 3 shows a WLAN PA 320 and a BT PA 322, but there may be additional, different, or fewer PAs for different wireless technologies. When, for example, the WLAN PA 320 current $I_{pwa}$ flows through the inductor 328, and induces a corresponding current $I_{pw}$ in the coupled inductor 330, which flows into the transmit port 302. When the impedances of the first inductive connection 310 and the second inductive connection 308 are approximately equal, then approximately equal currents $I_{pw1}$ and $I_{tw2}$ flow in opposite directions through the first inductive connection 310 and the second inductive connection 308. These currents have a counterbalancing effect on inductively coupled third inductive connection 312, which results in little or no current induced into the Shared LNA (SLNA) 324 on the receive side 326. That is, the receive side 326 is isolated from the transmit side 318.

During reception, the antenna 316 generates a receive signal, e.g., the current $I_r$, which induces a receive current $I_{r1}$ to the SLNA 324 flowing in the opposite direction as the current $I_r$, via the inductive coupling to the third inductive connection 312. Note that because of their polarity arrangement, there is a counterbalancing coupling between the first inductive connection 310 and the second inductive connection 308, and the received signal $I_r$ would pull a like amount of current up through the second inductive connection 308. However, the current $I_{r1}$ flowing in the third inductive connection 312 exerts a counterbalancing effect on the second inductive connection 308. The net result is little to no current flow through the EBN 314 during reception, and isolation between the antenna port 304 and the EBN branch.

The isolation circuit 300 may have a configuration that favors transmission or reception, or provide a balance between the two. When the impedance of the first inductive connection 310 is about equal to the impedance of the second inductive connection 308, the transmit signal splits about equally into $I_{tw1}$ and $I_{tw2}$ and operation is balanced. However, when the impedance of the first inductive connection 310 is smaller than the impedance of the second inductive connection 308, then $I_{tw1}$ may exceed $I_{tw2}$ according to the different in impedance. In that case, additional current drives the antenna 316, thereby favoring transmit operations. The SLNA 324 will receive a correspondingly reduced amount of power during receive operations. In many cases, transmission consumes more power than reception, and therefore it may be beneficial in terms of power consumption to favor transmission by adjusting the ratio of the impedances to increase the fraction of power flowing into the transmit port 302 that is delivered to the antenna.

Similarly, the isolation circuit 300 may have a configuration that favors reception. Specifically, when the impedance of the first inductive connection 310 is greater than the impedance of the second inductive connection 308 (the first inductive connection 310 is more tightly coupled with the third inductive connection 312) then the current $I_{r1}$ into the SLNA 324 can be made larger, providing additional receive signal to the SLNA. There is a corresponding reduction in transmit current into the antenna 316.

Figure 4:
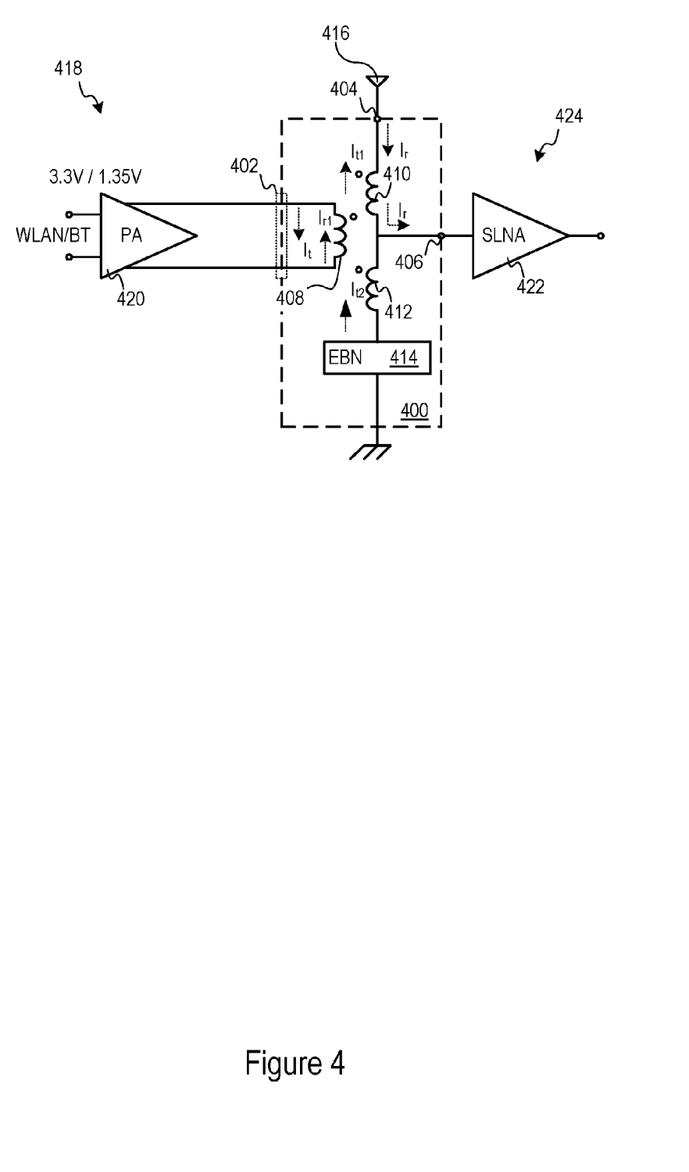
FIG. 4 is an example of a third realization of an isolation circuit.

FIG. 4 is an example of a third realization of an isolation circuit 400. The isolation circuit 400 may provide on the order of 200 to 300 MHz of wideband isolation. The isolation circuit 400 includes a transmit port 402 shared by multiple wireless technologies (e.g., WLAN and BT technology). An antenna port 404 is also present. The wireless technologies share a receive port 406. For the purposes of illustration, the transmit port 402 is shown in FIG. 4 as a differential transmit pair, however the transmit port may also be considered to be the inductive couplings between the first inductive connection 408, and the second and third inductive connections 410 and 412. These inductive couplings operate in a manner similar to that described above with respect to FIG. 3, and are described in more detail below.

The second inductive connection 410 is between the receive port 406 and the antenna port 404. The third inductive connection 412 runs between the receive port 406 and an EBN 414. The EBN 414 may be configured to match an impedance at the antenna port 404 (e.g., to match the impedance of the antenna 416). The third inductive connection 412 is configured to provide a current counterbalance to the second inductive connection 410, e.g., by setting the polarities as indicated by the dot convention used throughout the Figures. The first inductive connection 408 is inductively coupled to the second inductive connection 410 and the third inductive connection 412.

On the transmit side 418, a transmit PA 420 may be shared among multiple different wireless technologies (e.g., WLAN and BT). The transmit PA 420 drives the transmit port 402, e.g., with a differential input signal. On the receive side 424, a SLNA 422 provides amplification for both WLAN and BT, or any other wireless technology.

For transmit operation, the transmit PA 420 generates current $I_t$ through the first inductive connection 408, which induces corresponding currents $I_{t1}$ and $I_{t2}$ of equal amount through the second inductive connection 410 and third inductive connection 412. As a result, the receive port 406 does not need to provide any current. That is, the receive port 406 is effectively isolated from the transmit operation because the current $I_{t2}$ provides the transmit current $I_{t1}$ driven through the antenna 416, and node 406 need not provide any current.

During reception, the antenna 416 generates a receive signal, e.g., the current $I_r$. Note that because of their polarity arrangement, there is a counterbalancing coupling between the second inductive connection 410 and the third inductive connection 412, and the received signal $I_r$ would pull a like amount of current up through the third inductive connection 412. However, the current through the second inductive connection 410 induces a current $I_{r1}$ flowing in the first inductive connection 408 in the direction shown, which in turn exerts a counterbalancing effect on the third inductive connection 412, by inducing a current towards the EBN 414 to offset the current pull resulting from $I_r$. The net result is little to no current flow through the EBN 414 during reception, and delivery of the current $I_r$ to the SLNA 422.

In other words, the receive side and transmit side are isolated from one another, although not from the antenna 416. Due to the isolation, the receive side is effectively not impacted by the transmit operation, and the transmit side is not impacted by the receive operation. However, both the transmit and receive sides see the antenna 416 and EBN 414. The incoming current $I_{r1}$ will be dissipated in the PA 420, while no current flows to the EBN 414 through the third inductive connection 412. As a result, as shown in FIG. 4, all of current $I_r$ flows to the SLNA 422.

In the example shown in FIG. 4, the two wireless technologies share a common PA 420. The wireless technologies may operate at different output power levels, such as a nominal 20 dBm for WLAN and 10 dBm for BT. The PA 420 may have different efficiency characteristics depending on its voltage supply. The voltage supply may be set in many different ways, such as by maximizing PA efficiency. Because higher output powers (e.g., for WLAN or 3G/4G) are typically more expensive to generate, the PA 420 and isolation circuit 400 may be designed to maximize WLAN efficiency (or the efficiency of any other wireless technology).

Thus, for example, the voltage supply for the PA 420 may be set to 3.3 V and the impedance of the first inductive connection 408 made relatively low, to provide high WLAN efficiency. As another example, the voltage supply for the PA 420 may be set to 1.35 V, and the impedance of the first inductive connection 408 made relatively high, to provide high BT efficiency. A wide range of implementation parameters are possible, and it is not necessary to optimize the parameters for any single wireless technology. In other implementations, the voltage supply may be switched depending on which wireless technology is transmitting. For example, if only a particular wireless technology were transmitting (e.g., BT), then the system logic 114 may switch in a first supply voltage (e.g., 1.5 V) to the PA 420. When a different technology (e.g., WLAN) is transmitting, alone or at the same time as another technology, then the system logic 114 may switch in a second supply voltage (e.g., 3.3 V) for the PA 420 to enhance efficiency.

Figure 5:
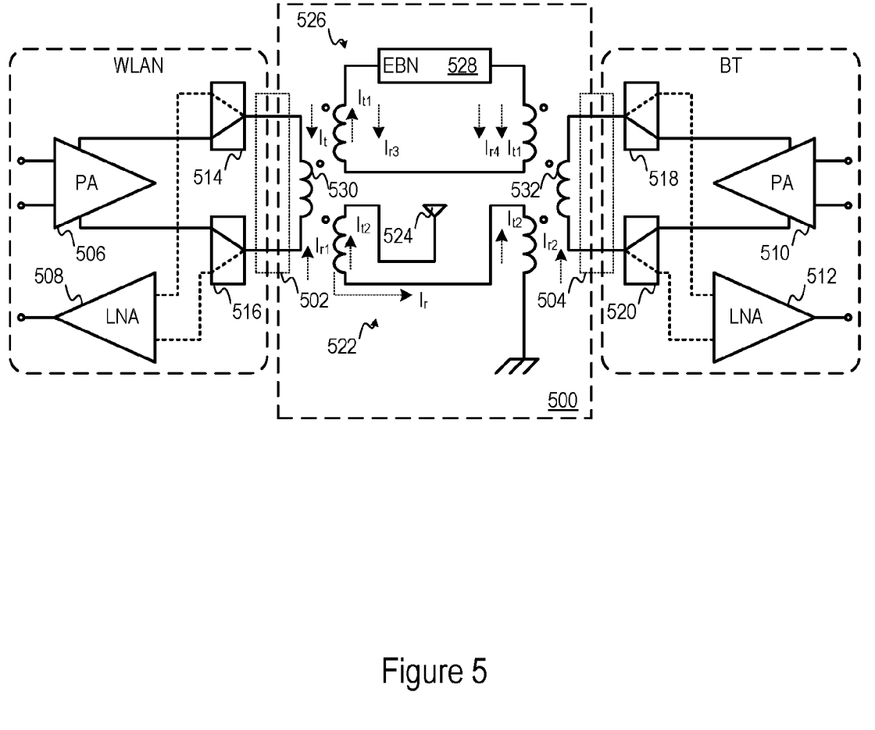
FIG. 5 is an example of a fourth realization of an isolation circuit.

FIG. 5 is an example of a fourth realization of an isolation circuit 500, which may be implemented, as one example, with a two core hybrid transformer. The isolation circuit 500 may provide on the order of 200 to 300 MHz of wideband isolation. The isolation circuit 500 includes a Tx and Rx port 502 for a first wireless technology (e.g., WLAN), and a Tx and Rx port 504 for a second wireless technology (e.g., BT). In the circuit 500 the Tx and Rx paths into the circuit 500 are not shared by the different wireless technologies. Instead, the first wireless technology employs its own PA 506 and LNA 508 in communication with the port 502, while the second wireless technology employs its own PA 510 and LNA 512 in communication with the port 504. In the example of FIG. 5, the Tx and Rx paths for both wireless technologies are differential Tx and Rx paths.

Tx/Rx switches support the differential paths for the different wireless technologies. In FIG. 5, a first Tx/Rx switch circuit 514 and a second Tx/Rx switch 516 switch the first wireless technology between differential Rx and differential Tx modes by coupling either the PA 506 or LNA 508 to the first port 502. Similarly, a third Tx/Rx receive circuit 518 and a fourth Tx/Rx switch 520 switch the second wireless technology between differential Rx and differential Tx modes by coupling either the PA 510 or LNA 512 to the first port 504.

The circuit 500 includes an antenna circuit 522 that includes an antenna 524, and a balancing circuit 526 that includes an EBN 528. The antenna circuit 522 and the balancing circuit 526 are inductively coupled between the first port 502 and the second port 504. The inductive coupling of the antenna circuit 522 and the balancing circuit 526 to the Tx and Rx ports 502 and 504 is configured to generate counterbalancing currents that effectively isolate the first wireless technology Tx and Rx port 502 from the second wireless technology Tx and Rx port 504.

In more detail, assume for example that the WLAN is transmitting and current $I_t$ is flowing in the first inductive connection 530. The current $I_t$ induces a current $I_{t1}$ flowing toward the EBN 528 and a current $I_{t2}$ flowing toward the antenna 524, as shown. The ratio of the two currents may be adjusted by adjusting the impedance of the inductive connections coupled to the Tx and Rx ports 502 and 504. In one implementation, the two currents are approximately equal. The currents $I_{t1}$ and $I_{t2}$ induce counterbalancing currents in the second inductive connection 532, resulting in little or no net current seen at the Tx and Rx port 504 for the second wireless technology. When the BT is transmitting, the same principles apply from the BT side, and as a result, the Tx and Rx ports 502 and 504 are effectively isolated, and both wireless technologies may transmit simultaneously.

During reception, the antenna 524 generates a current $I_r$ which induces currents $I_{r1}$ and $I_{r2}$ in the inductive connections 530 and 532, respectively. The currents $I_{r1}$ and $I_{r2}$ represent the receive power delivered to the LNAs 508 and 512 for simultaneous reception by the different wireless technologies. The currents $I_{r1}$ and $I_{r2}$ induce counterbalancing currents $I_{r3}$ and $I_{r4}$ in opposing branches of the balancing network 526, and result in effectively no net current in the balancing circuit 526. As a result, the antenna circuit 522 is isolated from the balancing circuit 526.

Figure 6:
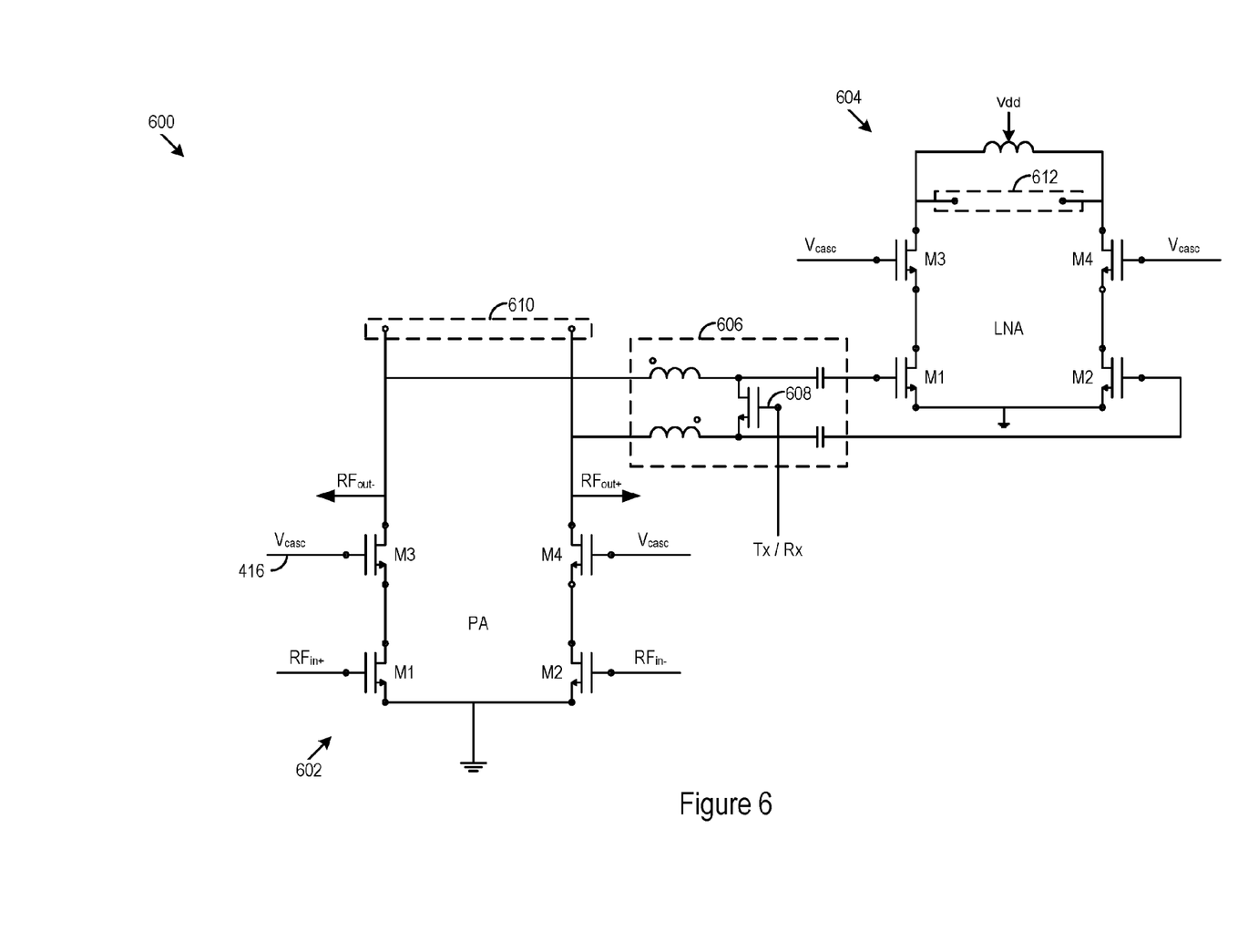
FIG. 6 shows an example of a differential PA and LNA with a Tx/Rx switch.

FIG. 6 shows an example 600 of a differential PA 602 and LNA 604 with Tx/Rx switch 606. The PA 602 and LNA 604 include cascode transistors M3 and M4 that are biased by the cascode voltage $V_{casc}$. Transistors M1 and M2 amplify the differential input RF signal or received RF signal and determine the gain of the PA 602 and LNA 604. For receive operation, the Tx/Rx switch 606 keeps the mode switch 608 open, which permits the signal received on the port 610 to pass the DC blocking capacitors in the Tx/Rx switch 606 and reach the LNA 604 for amplification, with the output taken at the differential output 612. For transmit operation, the Tx/Tx switch 606 closes the mode switch 608, which permits the differentially amplified RF outputs to drive the port 610. In this configuration, the inductors in the Tx/Rx switch 606 are in series and placed in parallel across the port 610 and between the RF outputs. The total inductance may be tuned out by the parasitic capacitance at the output 610, and may be considered, effectively, a very large resistance in parallel to the output which has no detrimental effect on the output of the PA 602.

Selective Bypass Modes

Figure 7:
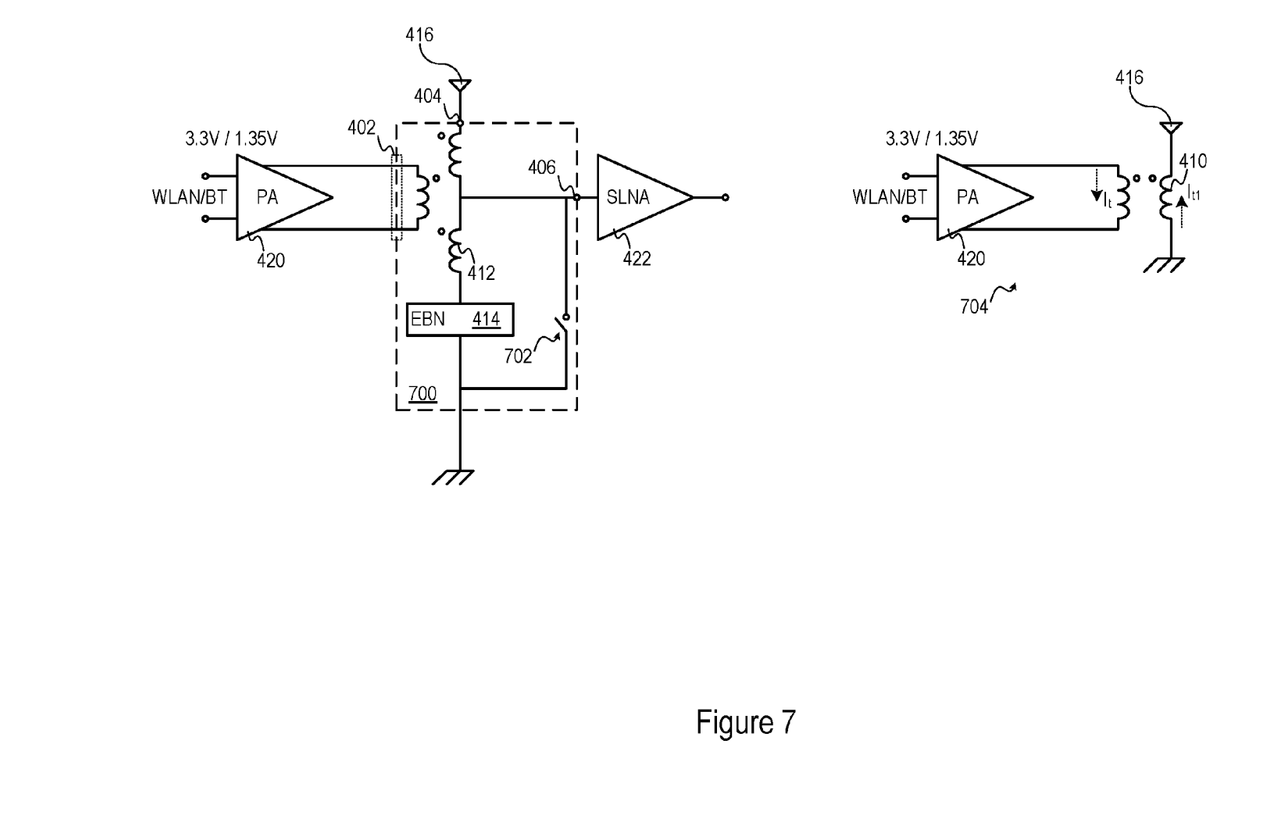
FIG. 7 shows an example of an isolation circuit with bypass.

In some implementations, the isolation circuits include bypass modes. The bypass modes help to reduce the insertion losses associated with the isolation circuits. FIG. 7 shows one example of an isolation circuit 700 with bypass. In particular, FIG. 7 extends the example shown in FIG. 4 by including a transmit bypass mode switch 702.

When transmitting, UE 100 may close the bypass mode switch 702. For any of the bypass mode circuits described in the Figures, the UE 100 may control the bypass mode switches using the system logic 114, logic in the communication interface 112, or in other ways. Closing the bypass mode switch 702 effectively bypasses the inductive connection 412 and the EBN 414. FIG. 7 shows the effective resultant transmit circuit 704.

Note that the full current $I_{t1}$ induced by the PA 420 in the second inductive connection 410 drives the antenna 416. In other words, the transmit current is not split through the EBN 414 and the antenna 416. The transmit bypass mode effectively reduces or eliminates the insertion loss (e.g., about 3 dB) that the circuit would otherwise experience during transmit.

Figure 8:
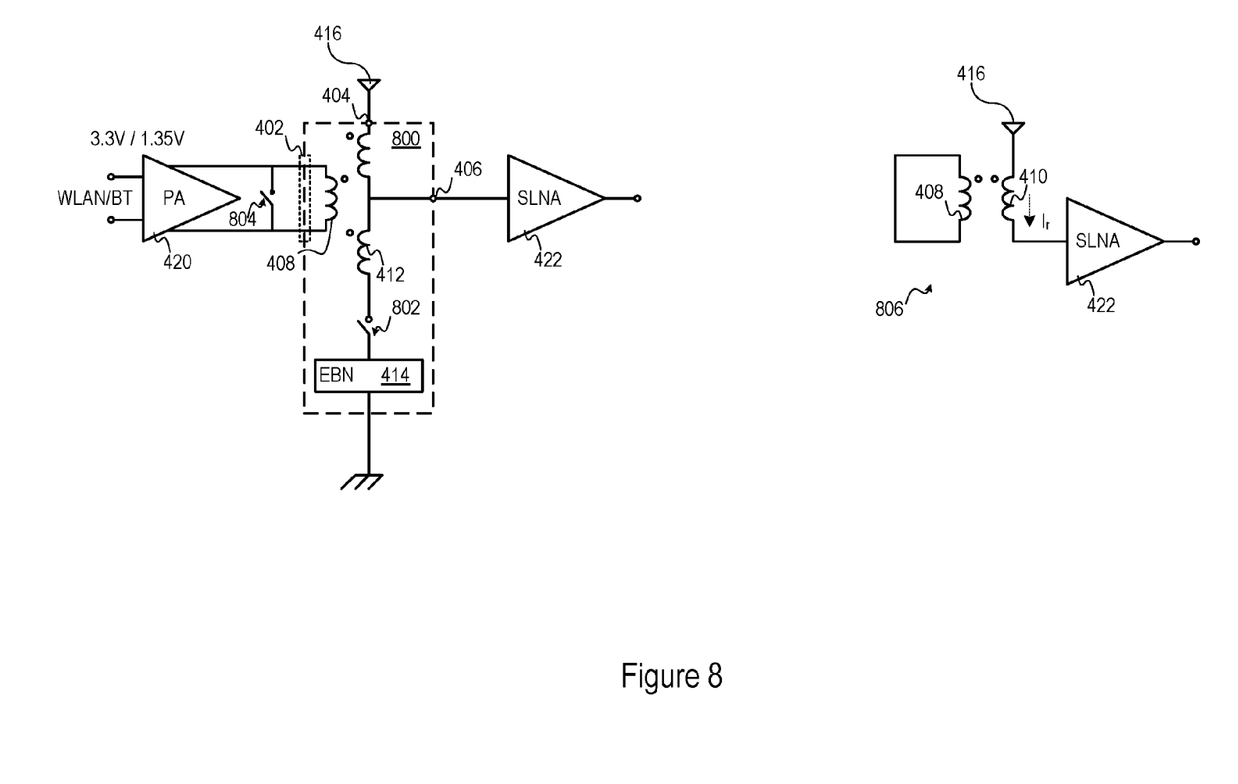
FIG. 8 shows another example of an isolation circuit with bypass.

FIG. 8 shows another example of an isolation circuit 800 with bypass. FIG. 8 also extends the example shown in FIG. 4. In FIG. 8, the circuitry includes receive bypass mode switches 802 and 804.

When receiving, the UE 100 may close the bypass mode switch 804 and open the bypass mode switch 802. Closing the bypass mode switch 804 effectively bypasses the PA 420 and the first inductive connection 408. Opening the bypass mode switch 802 effectively removes the EBN 414 from the circuit. FIG. 8 also shows the effective resultant receive circuit 806.

Note that the full current $I_r$ generated by the antenna 416 drives the SLNA 422. In other words, the receive current is not subject to attenuation by the isolation circuit 400 shown in FIG. 4. The receive bypass mode effectively reduces or eliminates the insertion loss (e.g., about 3 dB) that the circuit would otherwise experience during reception.

Figure 9:
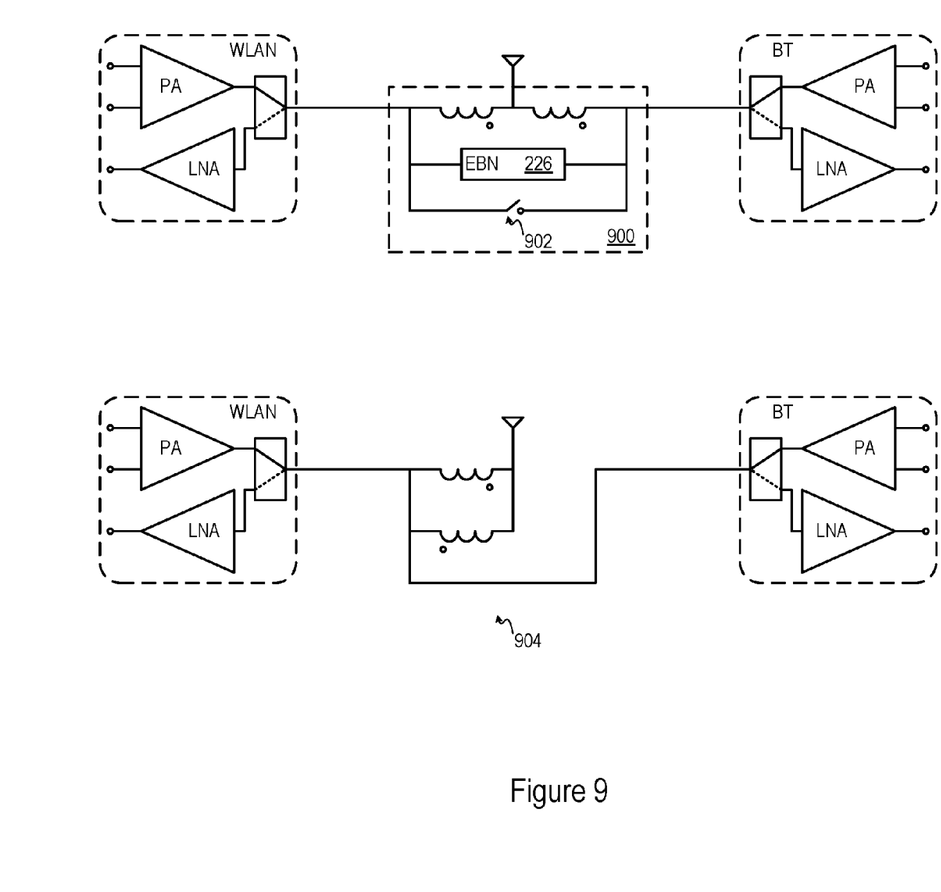
FIG. 9 shows one example of an isolation circuit with bypass.

FIG. 9 shows one example of an isolation circuit 900 with bypass. In particular, FIG. 9 extends the example shown in FIG. 2 by including a wireless technology selection bypass mode switch 902. When the UE 100 closes the mode switch 902, the EBN 226 is bypassed, obtaining the effective resultant circuit 904. In this example, the UE 100 may selectively allow operation for either the first wireless technology, or the second wireless technology, but not both at the same time.

When the mode switch 902 closes, the balun nodes are tied at each end. Assuming an ideal balun which promises strong coupling between inductors, the balun can be considered as an effective short circuit. For non-ideal baluns, the effective result is an inductor in series with the load, and there may be some power loss. This mechanism is identical for Tx and Rx operations. Tx and Rx may be performed with time division duplexing techniques.

Figure 10:
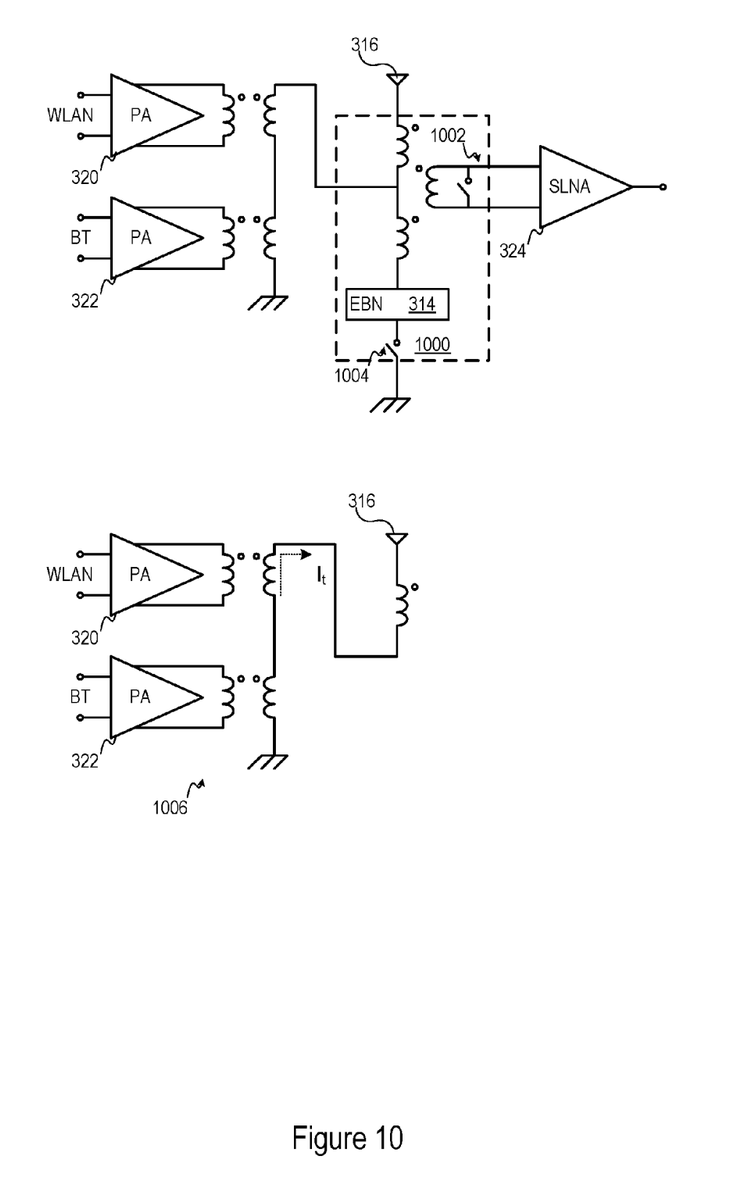
FIG. 10 shows another example of an isolation circuit with bypass.

FIG. 10 shows another example of an isolation circuit 1000 with bypass. In particular, FIG. 10 extends the example of FIG. 3. The UE 100 may configure the bypass mode switches 1002 and 1004 to facilitate transmission operations. Specifically, the UE may close the bypass mode switch 1002 (on the receive side) and open the bypass mode switch 1004 (in the EBN 314 branch). FIG. 10 shows the effective resultant circuit 1006. Note that all of the transmit current $I_t$ generated by the PAs 320 and 322 flows to the antenna 316. As a result, the transmit operation is not affected by the attenuation that would otherwise result without the bypass mode switches. Both wireless technologies may simultaneously transmit.

Figure 11:
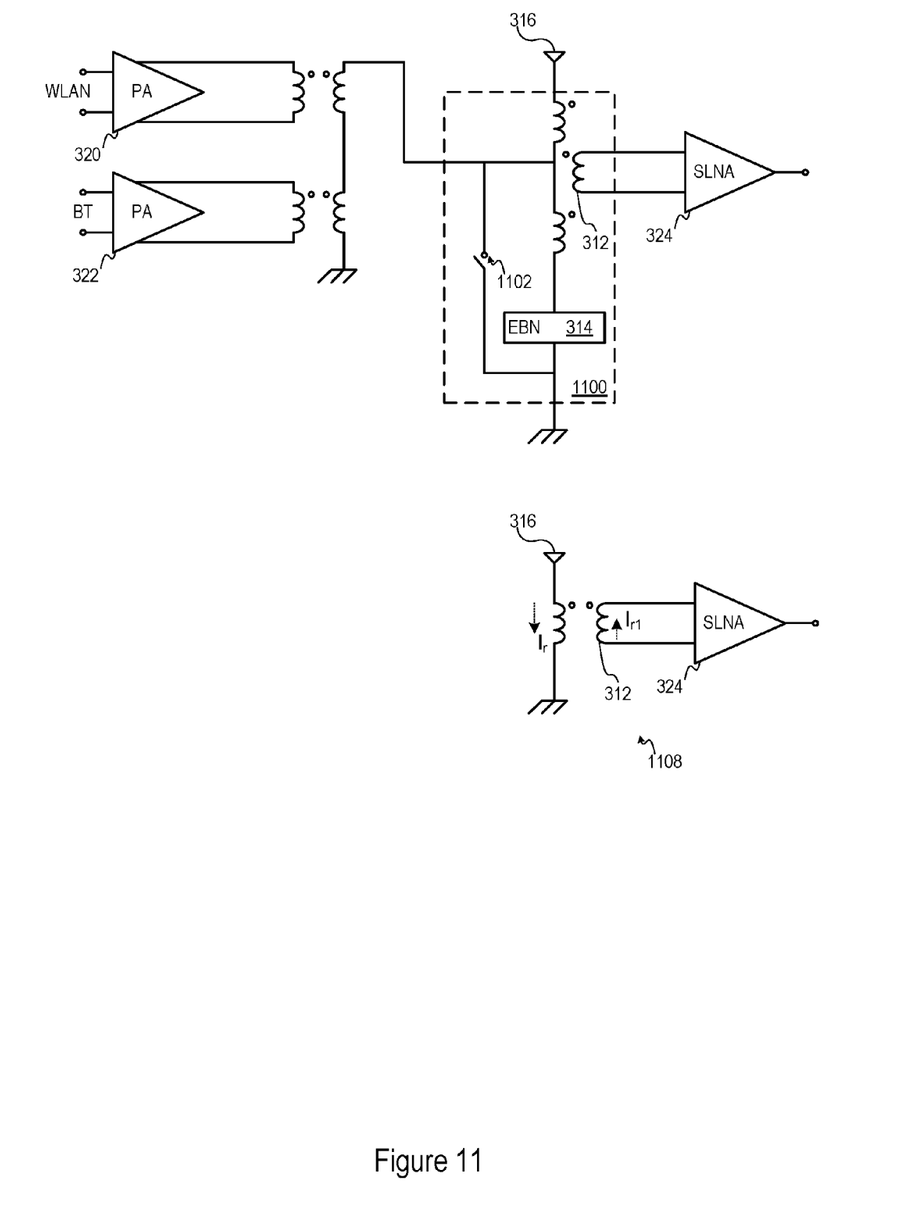
FIG. 11 shows another example of an isolation circuit with bypass.

FIG. 11 shows another example of an isolation circuit 1100 with bypass. The example in FIG. 11 also extends the example shown in FIG. 3. The UE 100 may configure the bypass mode switch 1102 to facilitate receive operations. Specifically, the UE may close the bypass mode switch 1102 in the EBN 314 branch to by bypass the EBN 314. Once switch 1102 is closed and shorts the node to ground, any circuitry connected to that node is grounded as well. Effectively, any circuitry to the left of the grounded node is not seen during reception.

FIG. 11 shows the effective resultant circuit 1108. The antenna 316 generates current $I_r$ which induces the receive current $I_{r1}$. The receive current $I_{r1}$ is the signal that SLNA 324 amplifies and delivers to subsequent receive side circuitry to recover data from the received signal. Note that unlike the operation shown in FIG. 3, the current $I_r$ is not split, and as a result, the full current $I_r$ can deliver power to the SLNA 324 through the third inductive connection 312.

Figure 12:
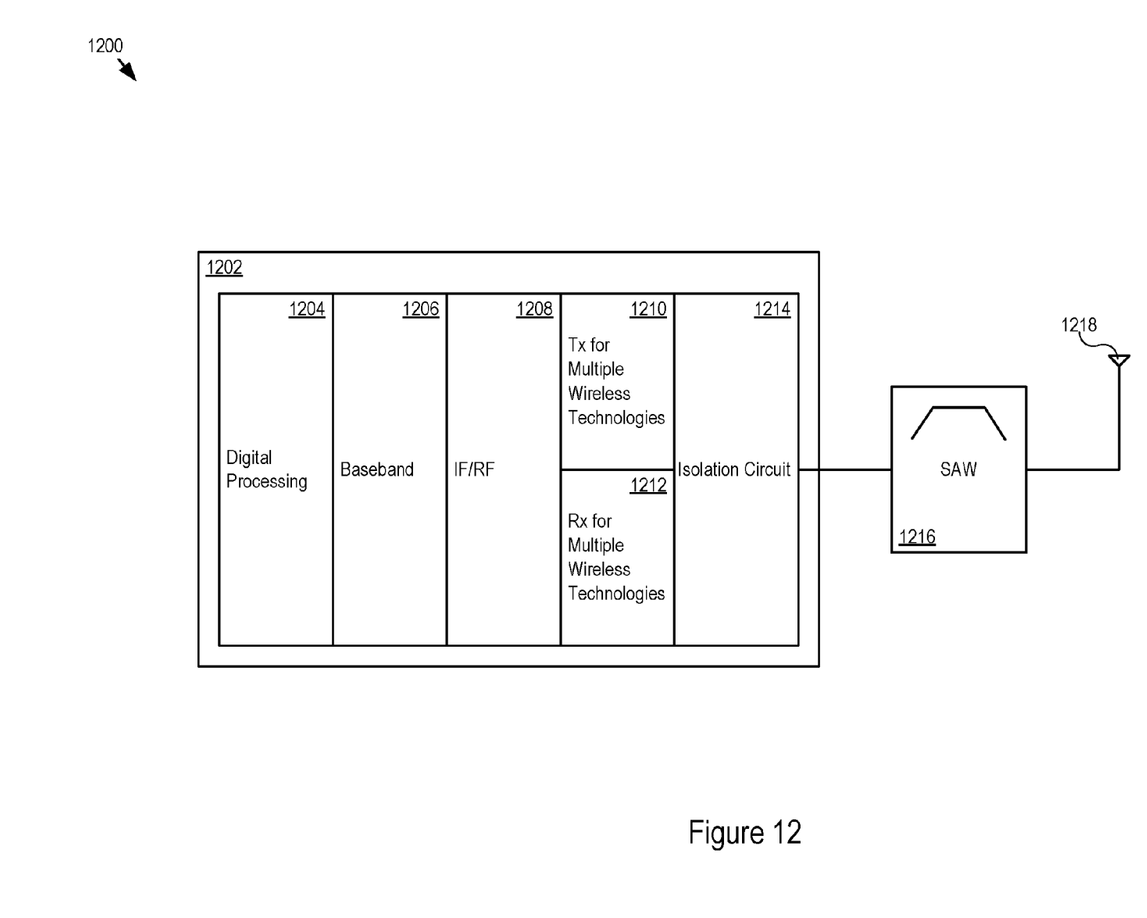
FIG. 12 shows an example of a chip configured with an isolation circuit.

FIG. 12 shows an example circuit configuration 1200 including a chip 1202 configured with an isolation circuit. The chip 1202 may be designed in many different ways and implement a wide spectrum of functionality. As one example, the chip 1202 may include a digital processing section 1204, a baseband section 1206, and an Intermediate Frequency (IF)/Radio Frequency (RF) section 1208. The digital processing section 1204 may include any number of processing cores responsible executing any applications or other instructions that implement any desired functionality. The baseband section 1206 may prepare baseband data for transmission, e.g., by applying error detection or correction coding, and may process received data, e.g., by performing error detection and correction processing on the received data. The IF/RF section 1208 may translate the baseband data to IF or RF for transmission, and may convert IF/RF to baseband for reception.

The chip 1202 may also include Tx circuitry 1210 for multiple different wireless technologies. Similarly, the chip 1202 may include Rx circuitry 1212 for multiple different wireless technologies. Several examples of the technologies and the Tx and Rx circuitry were given above in FIGS. 1-5 and 7-11. Further, the chip may include isolation circuitry 1214 coupled to the Tx circuitry 1210 and Rx circuitry 1212. Multiple examples of the isolation circuitry 1214 were given above in FIGS. 2-5 and 7-11.

Exterior to the chip, a Surface Acoustic Wave (SAW) filter 1216 may filter the transmitted and received signal. The filtered transmit signal drives the antenna 1218. The signal received at the antenna 1218 passes through the SAW filter 1216 for reception by the chip 1202.

The isolation circuitry 1214 helps meet the highly demanding markets that include simultaneous operation by multiple wireless technologies, such as simultaneous LTE and WLAN operation. The isolation circuitry 1214 reduces the cost, complexity, board area and chip area for implementing the multiple wireless technologies. In contrast to TDD designs, the simultaneous operation of multiple different wireless technologies helps to eliminate multiple circuit blocks including multiple duplexers (e.g., to select between LTE Tx and Rx) and Tx/Rx switches (e.g., to switch between WLAN Tx and Rx), multiple SAW filters (e.g., one for each wireless technology), and a duplexer (e.g., to select between WLAN and LTE) prior to the antenna.

Figure 13:
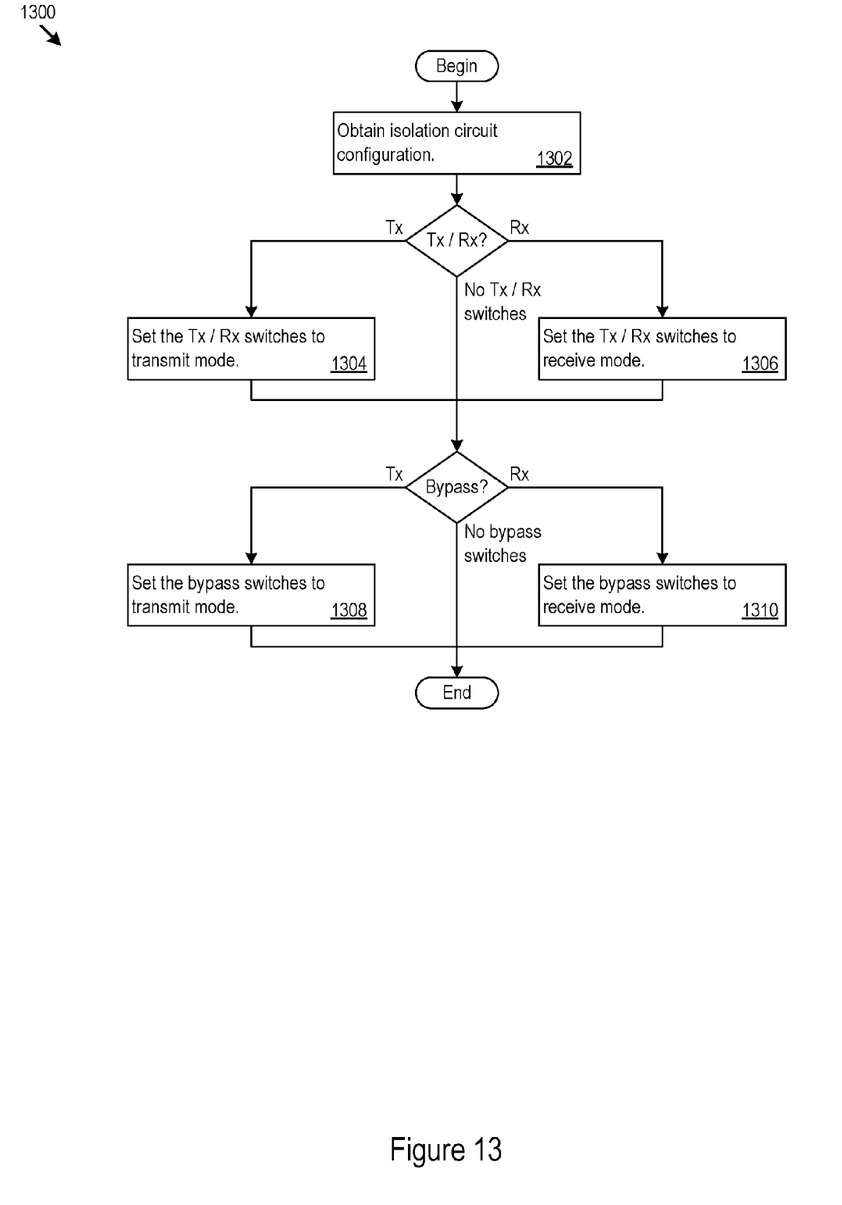
FIG. 13 shows an example of logic that user equipment may execute to control the Tx/Rx circuits shown in the Figures that include isolation circuits.

FIG. 13 shows an example of logic 1300 that the UE 100 may implement, for example in the system logic 114 or in the communication interface 112. The logic 1300 determines the Tx/Rx circuit configuration (1302) in which the isolation circuit is present. For example, the Tx/Rx circuit configuration may be embodied in program instructions that control the isolation circuit, or the UE 100 may obtain the configuration by retrieving, from a non-volatile memory, configuration data that specifies whether Tx/Rx circuit includes any Tx/Rx switches (e.g., as with the Tx/Rx circuits in FIG. 2 and FIG. 5) and whether the Tx/Rx circuits include any bypass mode switches (e.g., as with the Tx/Rx circuits in FIGS. 10 and 11).

During operation, the logic 1300 determines whether the UE 100 will transmit or receive. For transmit, the logic 1300 sets the Tx/Rx switches (e.g., the switches 514, 516, 518, and 520) to transmit mode (1304). For receive, the logic 1300 sets the Tx/Rx switches to receive mode (1306). In addition, the logic 1300 may set bypass switches. For transmit, the logic 1300 sets the bypass switches (e.g., the bypass mode switches 1002, 1004) to transmit mode (1308). For receive, the logic 1300 sets the bypass switches (e.g., 1102) to receive mode (1310).

Various implementations have been specifically described. However, many other implementations are also possible.

What is claimed is:

1. A circuit comprising:
   a first wireless technology communication port;
   a second wireless technology communication port;
   an antenna port shared by the first wireless technology communication port and the second wireless technology communication port;
   a first inductive connection between the first port and the antenna port;
   an electrical balancing network coupled between the first port and the second port, the electrical balancing network configured to implement an impedance matched to the antenna port that splits current to divert a portion of a current flowing through the first inductive connection to instead flow from flowing through the first inductive connection to flow instead through the electrical balancing network; and
   a second inductive connection between the second port and the antenna port, the second inductive connection implementing a counterbalance coupling with the first inductive connection that is configured to draw the portion of the current to the antenna.

2. The circuit of claim 1, further comprising:
   a transmit/receive switch coupled to the first port and operable to select between transmission or reception at the first wireless technology communication port.

3. The circuit of claim 1, further comprising:

a transmit/receive switch coupled to the second port and operable to select between transmission and reception at the second wireless technology communication port.

4. The circuit of claim 1, further comprising:
a first transmit/receive switch coupled to the first port and operable to select between transmission or reception at the first wireless technology communication port;
a second transmit/receive switch coupled to the second wireless technology communication port and operable to select between transmission and reception at the second wireless technology communication port; and
a control input operable to set the first transmit/receive switch and the second transmit/receive switch for simultaneous transmission by both the first port and the second wireless technology communication port.

5. The circuit of claim 1, further comprising:
a first transmit/receive switch coupled to the first port and operable to select between transmission and reception for the first wireless technology communication port;
a second transmit/receive switch coupled to the second port and operable to select between transmission and reception for the second wireless technology communication port; and
a control input operable to set the first transmit/receive switch and the second transmit/receive switch for simultaneous reception by both the first wireless technology communication port and the second wireless technology communication port.

6. The circuit of claim 1, where:
the first and second inductive connections are configured to split a signal received at the antenna to provide, for simultaneous reception:
    a first receive signal to the first wireless technology communication port; and
    a second receive signal to the second wireless technology communication port.

7. The circuit of claim 1, further comprising:
a wireless network transmit amplifier and a wireless network receive amplifier in communication with the first wireless technology communication port.

8. The circuit of claim 7, further comprising:
a near field transmit amplifier and a near field receive amplifier in communication with the second wireless technology communication port.

9. A circuit comprising:
a shared transmit port shared by a first wireless technology and a second wireless technology;
a shared receive port shared by the first wireless technology and the second wireless technology;
an antenna port;
a first inductive connection from the shared transmit port to the antenna port;
an electrical balancing network configured to implement an impedance matched to the antenna port that diverts a portion of a current from flowing through the first inductive connection to flow instead flow through the electrical balancing network;
a second inductive connection between the first inductive connection and the electrical balancing network, the second inductive connection configured to inductively counterbalance the first inductive connection when the portion of the current flows through the second inductive connection to the electrical balancing network; and a third inductive connection coupled to the first inductive connection and the second inductive connection and the shared receive port.

10. The circuit of claim 9, where:
the shared receive port comprises a differential receive output.

11. The circuit of claim 9, further comprising:
a receive amplifier coupled to the shared receive port.

12. The circuit of claim 9, where:
the first inductive connection and the second inductive connection comprise approximately equal impedance.

13. The circuit of claim 9, where:
the first inductive connection comprises a first impedance;
the second inductive connection comprises a second impedance; and
the first impedance is set in relation to the second impedance to favor transmission over reception.

14. The circuit of claim 9, where:
the first inductive connection comprises a first impedance;
the second inductive connection comprises a second impedance; and
the first impedance is set in relation to the second impedance to favor reception over transmission.

15. The circuit of claim 9, where the second inductive connection is configured to inductively counterbalance the first inductive connection by countering induction by the first inductive connection on the third inductive connection.

16. A device comprising:
a first wireless technology port configured to generate an induction effect;
a second wireless technology port;
an antenna circuit inductively coupled inductively coupled between:
    the first wireless technology port; and
    the second wireless technology port; and
an electrical balancing network inductively coupled between:
    the first wireless technology port; and
    the second wireless technology port; and
where the electrical balancing network is configured to facilitate a split of the induction effect between the antenna circuit and the electrical balancing network to redirect, at least in part, the induction effect to drive current through the electrical balancing network rather than drive current within the antenna circuit.

17. The device of claim 16, further comprising:
first differential transmit/receive switches circuit coupled to the first wireless technology port and operable to select between differential transmission and differential reception for the first wireless technology.

18. The device of claim 17, further comprising:
second differential transmit/receive switches circuit coupled to the second port and operable to select between differential transmission and differential reception for the second wireless technology.

19. The device of claim 16, where:
the inductive couplings are configured to generate counterbalancing currents that isolate the first wireless technology port from the second wireless technology.

20. The device of claim 16 where the first transmit and receive port is configured to cause transmission by inducing a current between a ground and an antenna within the antenna circuit.

* * * * *